April 18, 1933.   W. L. KUBACH   1,904,059
METHOD AND APPARATUS FOR TESTING INCANDESCENT
LAMPS AND SIMILAR ARTICLES
Filed April 23, 1928
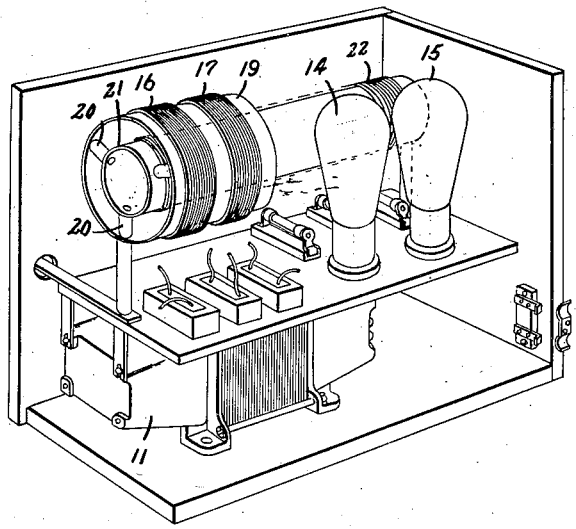
INVENTOR:
WILLIAM L. KUBACH,
BY Charles E. Mullan
HIS ATTORNEY.

Patented Apr. 18, 1933

1,904,059

UNITED STATES PATENT OFFICE

WILLIAM L. KUBACH, OF EAST CLEVELAND, OHIO, ASSIGNOR TO GENERAL ELECTRIC COMPANY, A CORPORATION OF NEW YORK

METHOD AND APPARATUS FOR TESTING INCANDESCENT LAMPS AND SIMILAR ARTICLES

Application filed April 23, 1928. Serial No. 272,175.

My invention relates to methods and apparatus for assisting in the sorting of incandescent lamps and similar devices comprising an evacuated or gas-filled enclosure such as a bulb. The specific embodiment disclosed in the present application is a method and apparatus for inspecting or testing such devices to determine the degree of vacuum or the nature of the gas filling. However, it will be apparent that my method and apparatus when considered from a broader aspect could be associated with devices for automatically sorting the lamps or other devices. It has been customary to test these devices after the exhaust or gas filling thereof by means of a high frequency glow test. The color of the glow in the bulb or other container has served to indicate whether the proper degree of vacuum had been secured, or in case of the gas filled device, whether the gas was of the proper constituency or purity, but my invention provides a much more delicate means of testing. According to my invention, I subject the incandescent lamp or other device to high frequency discharge but provide means actuated by the current passing through the device under test whereby the variations in the resistance to the high frequency discharge are shown on a suitable indicator or measuring device. These variations in resistance indicate the degree of vacuum or the character of the gas filling. In the case of the vacuum device, the resistance through the device is decreased by the presence, for instance, of a small amount of air, and in the case of the gas-filled lamp where argon, for instance, is used as the gas filling, the presence of air increases the resistance. The corresponding effects on the current flowing are caused to be shown on the indicator or measuring device. The special advantages of my invention for testing frosted, opal or colored lamps will be apparent in view of the difficulty of inspecting the color of the glow in such lamps. It will be apparent also that in place of the current indicator a member controlled by the current and forming part of a sorting device could be substituted. A feature of my invention is that the electrode to which the device is brought for the test substantially encloses the device and this causes the indications to be more reliable than where an ordinary electrode is used. Various other features and advantages of my invention will appear from the detailed description of species thereof which follows.

Fig. 1 is a diagrammatic view of one species of my invention as applied to the inspection of a partially completed electric incandescent lamp; and Fig. 2 is a view in perspective partially broken away of a part of the apparatus.

As shown in Fig. 1, the supply circuit may be the ordinary lighting circuit, for instance, 115 volts, 60 cycle. This current passes through the primary 10 of a power transformer 11 shown in Fig. 2. There are two secondary windings 12 and 13, the winding 12 being such as to produce 500 volts for the plate circuits of the two three-element vacuum tubes 14 and 15. The other secondary coil is such as to produce a low voltage, for instance 7.2 volts, for the filament circuits of the said vacuum tubes. Included in the plate circuit of the vacuum tubes is what may be termed a plate coil 16. In the grid circuits of the vacuum tubes is included what may be termed a grid coil 17. Also in the grid circuit is included the variable grid leak 18. The purpose of this is to make possible a definite starting load and consequently a definite initial setting of the measuring device. As shown in Fig. 2, the plate coil 16 and the grid coil 17 may be wound on the same piece of tubing 19 of bakelite or other suitable insulation. This is spaced by suitable insulating spacers 20 from the inner insulating tube 21 upon which the high frequency secondary coil 22 is wound. The high frequency secondary coil is grounded at one end and the other is connected to the electrode into which the device to be tested is inserted, specifically the metal receptacle 23. The partially completed incandescent lamp 24 is caused to enter said receptacle for the inspection test and this is preferably done after the lamp has been disconnected from the portion 25 of the exhaust machine (not shown) and after the exhaust tube 26 has been sealed off. The lamp is connected to ground by the connections shown diagrammatically as 27. Included in the plate circuit is an A. C. or D. C. milliammeter 28 which serves to indicate changes in current in the plate circuit.

With the above described arrangement the incandescent lamp is subjected to a high frequency discharge, for instance, of 25,000 volts and 500 kilocycles. If the lamp is gas-filled with argon and there should happen to be some air present, the resistance through the lamp to the discharge is increased and the current correspondingly lowered. This induces a change in the plate and grid circuits of the vacuum tubes due to the coils 16 and 17, and the effect on current flowing in the plate circuit is shown by the indication on the milli-ammeter 28. The vacuum tube oscillating circuit shown is of an ordinary type and comprises the usual by-pass condenser 29, the plate-tuning condenser 30 and the grid condenser 31. The resistances 32 and 33 are for the purpose of equalizing the load when two vacuum tubes are being used in parallel.

What I claim as new and desire to secure by Letters Patent of the United States is:

1. In an apparatus for testing devices comprising an evacuated or gas-filled enclosure, the combination of a receptacle into which said device may be inserted and a high-frequency electrical discharge circuit including said receptacle comprising current indicating means actuated by the current flowing in said circuit while the device is being subjected to said discharge.

2. In an apparatus for testing devices comprising an evacuated or gas-filled enclosure, the combination of a receptacle into which said device may be inserted and a high-frequency electrical discharge circuit including said receptacle comprising a vacuum tube oscillating circuit and current indicating means actuated by current flowing in the vacuum tube plate circuit while the device is being subjected to said discharge.

3. The method of testing devices comprising an evacuated or gas-filled enclosure and an electrically conductive element therein which consists in subjecting said devices to a high frequency electric discharge directed therethrough from an external electrode and passing or rejecting each device according to the resistance of its contained gases as indicated on a current measuring device included in said high frequency circuit.

4. In an apparatus for testing devices comprising an evacuated or gas-filled enclosure and an electrically conductive element therein, the combination of a cup-shaped external electrode into which said device may be inserted and a high frequency electrical discharge circuit including said electrode comprising current indicating means actuated by the current flowing in said circuit while the device is being subjected to said discharge.

In witness whereof I have hereunto set my hand this 20th day of April, 1928.

WILLIAM L. KUBACH.